(12) United States Patent
Garella et al.

(10) Patent No.: US 9,993,792 B2
(45) Date of Patent: Jun. 12, 2018

(54) GAS DISTRIBUTION NOZZLE

(71) Applicant: BASF SE, Ludwigshafen (DE)

(72) Inventors: Dominik Garella, Wiesloch (DE); Kati Bachmann, Mannheim (DE)

(73) Assignee: BASF SE, Ludwigshafen (DE)

( * ) Notice: Subject to any disclaimer, the term of this patent is extended or adjusted under 35 U.S.C. 154(b) by 8 days.

(21) Appl. No.: 15/100,367

(22) PCT Filed: Dec. 3, 2014

(86) PCT No.: PCT/EP2014/076328
§ 371 (c)(1),
(2) Date: May 31, 2016

(87) PCT Pub. No.: WO2015/082506
PCT Pub. Date: Jun. 11, 2015

(65) Prior Publication Data
US 2017/0165625 A1    Jun. 15, 2017

(30) Foreign Application Priority Data

Dec. 4, 2013 (EP) ..................... 13195614

(51) Int. Cl.
*B01J 8/18* (2006.01)
*B01J 8/24* (2006.01)
(52) U.S. Cl.
CPC ........... *B01J 8/1818* (2013.01); *B01J 8/1809* (2013.01); *B01J 8/24* (2013.01); *B01J 2208/00548* (2013.01); *B01J 2208/00902* (2013.01)

(58) Field of Classification Search
CPC . B01J 8/1818; B01J 8/1809; B01J 8/44; B01J 2208/00902; B01J 2208/00938; B01J 2208/00548
See application file for complete search history.

(56) References Cited

U.S. PATENT DOCUMENTS

| 3,386,182 | A |   | 6/1968  | Lippert          |          |
|-----------|---|---|---------|------------------|----------|
| 3,921,663 | A |   | 11/1975 | Beranek et al.   |          |
| 4,387,667 | A |   | 6/1983  | Goodstine et al. |          |
| 4,574,496 | A | * | 3/1986  | Sedlacek ....... | B01J 8/44 |
|           |   |   |         |                  | 110/245  |

(Continued)

FOREIGN PATENT DOCUMENTS

DE    4443292 A1    6/1996
FR    1233498 A     10/1960

(Continued)

OTHER PUBLICATIONS

Translation of International Search Report for PCT/EP2014/076328 dated Mar. 4, 2015.

(Continued)

*Primary Examiner* — Lessanework Seifu
(74) *Attorney, Agent, or Firm* — Drinker Biddle & Reath LLP

(57) ABSTRACT

The invention relates to a gas distributor nozzle (25) comprising a gas feed (1) directed vertically upwards and a float (13) with which an outlet orifice out of the gas feed (1) may be closed if no gas is flowing, wherein the float (13) has a center of gravity which is below a point of force application of the gas flow. The invention further comprises a reactor with a solid bed and at least one gas distributor nozzle (25).

12 Claims, 2 Drawing Sheets

(56) References Cited

U.S. PATENT DOCUMENTS 5,806,206 A 9/1998 Christian
2016/0289141 A1 10/2016 Bachmann et al.

FOREIGN PATENT DOCUMENTS

GB 668325 A 3/1952
JP S63252540 A 10/1988
NL 1004621 C2 5/1998

OTHER PUBLICATIONS

International Preliminary Examination Report for PCT/EP2014/076328 dated Dec. 3, 2015 with Applicant response.
International Search Report for PCT/EP2014/076328 dated Mar. 4, 2015.

* cited by examiner

GAS DISTRIBUTION NOZZLE

CROSS-REFERENCE TO RELATED APPLICATIONS

This application is a national stage application (under 35 U.S.C. § 371) of PCT/EP2014/076328, filed Dec. 3, 2014, which claims benefit of European Application No. 13195614.6, filed Dec. 4, 2013, both of which are incorporated herein by reference in their entirety.

The invention relates to a gas distributor nozzle comprising a gas feed directed vertically upwards and a float with which an outlet orifice out of the gas feed may be closed if no gas is flowing or if the pressure in the flow direction is greater downstream of the gas distributor nozzle than upstream of the gas distributor nozzle.

Gas distributor nozzles are used, for example, to introduce gas into a solid bed. Solid beds conventionally comprise granules or a powder, through which the gas flows. Solid beds in which a gas distributor nozzle is used, are for example fluidized beds, fluid beds or moving beds.

The introduction of gas into the solid bed via gas distributor nozzles conventionally proceeds via a wind box, from which the gas is introduced by suitable gas distributors into the solid bed. In this case, it is necessary to configure the gas distributors in such a way that no particles from the solid bed are able to pass into the wind box via the gas distributors.

Gas distributors may for example be spargers, perforated plates, curved perforated plates or nozzle plates. The gas should be distributed uniformly over the entire cross-section by the gas distributors. To this end, the gas distributors must have a minimum pressure drop in proportion to the solid bed pressure drop. The rule of thumb for fluidized beds is that the pressure drop over the gas distributor must be at least 20% to 30% of the fluidized bed pressure drop. If it is considered when designing fluidized bed installations on a large industrial scale that these also need to be operated under partial load, i.e. when less gas is flowing through the gas distributor floor, this always means for the full load operation that the pressure drop over the gas distributor floor is markedly above the setpoint of 20% to 30% of the fluidized bed pressure drop, so resulting in elevated operating costs.

A disadvantage of spargers is that, particularly in the lower part of the solid bed, uniform gas distribution over the entire cross-section cannot be achieved. Although perforated plates allow even gas distribution over the entire cross-section, it should be take into account here that particles may under certain circumstances trickle downwards through the holes into the wind box during steady-state operation. To counteract this, a person skilled in the art uses nozzle plates. These comprise gas distributor nozzles, which are arranged adjacent to one another on a base plate. In normal operation, the design of these nozzles prevents particles from trickling back into the wind box. However, in practice it has been found that when solid beds are in operation states arise in which particles may also trickle back through a gas distributor nozzle, as described above. Such a state may for example be the abrupt failure of the gas supply or indeed a pressure reversal in the solid bed. Pressure reversal is understood to mean a higher pressure downstream of the gas distributor nozzle in the flow direction than upstream thereof. This state may arise if the waste gas path of the solid bed is abruptly closed due to safety measures but the gas feed remains open for a short time longer. If this occurs, a higher pressure briefly arises downstream of the gas distributor nozzle, which leads to particle flow through the nozzles into the wind box. It is moreover also possible for gas to flow back through the nozzles in the event of compressor failure in the gas recirculation system and to entrain particles in the process.

Particles which pass into the wind box are entrained by the gas flow in the wind box and may in this way lead to undesired erosion of the gas distributor nozzles. This process accelerates, the more damaged the gas distributor nozzles become. If the damage is so major that even gas distribution over the cross section is no longer achieved, the installation has to be shut down. In addition, particles may clog individual nozzles, such that gas can no longer flow therethrough into the solid bed, resulting in uneven flow distribution over the cross-section. Even gas distribution is important, for example when performing exothermic reactions in a fluidized bed reactor, since in this way an even temperature distribution is achieved. The formation of hot zones is generally undesirable, since they may result, for example, in reductions in capacity or unsafe states.

Moreover, there is also the possibility of the material of the solid bed having a corrosive action in the event of capillary condensation through adsorption of the gases used. This is the case in particular if a catalyst is used as the material for the solid bed and the gases used as starting materials or optionally also the reaction product have a corrosive effect on the material of the windbox. Capillary condensation arises in particular if the temperature at which feed into the wind box takes place is lower than the operating temperature.

In particular when the material for the solid bed is a catalyst and in addition a reactive mixture is already being introduced into the wind box, contact with particles flowing back into the wind box may lead to an undesired reaction. In the case in particular of exothermic reactions, this leads to a temperature rise in the wind box, since the heat arising cannot conventionally be adequately dissipated.

It is moreover necessary to clean the wind box regularly and to remove the particles from the wind box, to which end the process has to be interrupted every time, so reducing the efficiency of the method and increasing operating costs.

To prevent particles from a solid bed from being able to flow back through gas distributor nozzles, it is known from U.S. Pat. No. 3,386,182, for example, to use a central gas distributor nozzle, which has a closing element which is closed with spring assistance if gas flow is interrupted.

U.S. Pat. No. 4,387,667 discloses a float, which is used to establish a constant pressure drop. In this case, the float takes the form of a cone standing on its tip and has ribs distributed around its circumference, with which ribs the float rests against a sleeve when gas flow is too slight. Here, the sleeve has a conical cross-section which widens towards the gas flow. The float described therein does not make it possible to prevent particle backflow.

A float in the form of a sphere is known from U.S. Pat. No. 3,921,663. When gas flow is too low, said sphere sits on a riser. A sleeve with a conically widening cross-section is provided above the riser. This ensures that the sphere sits on the riser in the event of decreasing gas flow.

A disadvantage of all the floats known from the prior art is either that they do not enable the establishment of a constant pressure drop independently of the volumetric gas flow rate passing through the nozzle, in order to allow uniform operation of the solid bed, or that the float does not make it possible to prevent particles from being retained in the solid bed, in particular in the event of low gas flow or flow reversal. A further disadvantage is that for the desired pressure drop the floats have in general to be very heavy, which results in unstable operating conditions.

The object of the present invention is accordingly that of providing a gas distributor nozzle which allows a constant pressure drop to be established even in the case of fluctuating gas flow and also prevents backflow of particles from the solid bed in the event of complete or partial failure of the gas supply or in the event of pressure reversal at the bottom.

The object is achieved by a gas distributor nozzle comprising a gas feed directed vertically upwards and a float with which an outlet orifice out of the gas feed may be closed if the gas velocity falls below a given value, no gas is flowing or a pressure reversal occurs, wherein the float has a center of gravity which is below the point of force application of the resistance of the gas flow.

Arranging the center of gravity below the point of force application of the resistance of the gas flow ensures that unstable operating states cannot become established. If the float begins to oscillate or begins to tilt due to uneven gas flow, it straightens itself up again due to the center of gravity below the point of force application and stabilizes itself. This also prevents the float from getting jammed, such that the closing function is not impaired. It is moreover possible with the float to establish a constant pressure drop independently of the amount of gas supplied.

For the purposes of the present invention, the point of force application of the resistance of the gas flow is the point at which the stress exerted by the gas flow and integrated over the surface of the float can be combined to a resulting force. This point is known to a person skilled in the art as the center of pressure and is not necessarily the centroid of the surface of the float. The position of the point of force application of the resistance of the flow depends here on the compressive stresses and shear stresses on the circumferential surface of the float. The dynamic pressure is moreover dependent on the local flow velocity, which results from the operating volumetric flow rate through the nozzle, the morphology of the nozzle and of the float and the position of the float in the nozzle.

When the float is designed such that the centroid and the center of pressure are on the same axis, for example for a point symmetrical or axially symmetrical float, for the purposes of the present invention, the point of force application of the resistance of the gas flow alternatively is determined as the point at which the stresses integrated over the surface of the float and exerted by the gas flow can be combined as a force vector in such a way that no torque is present relative to this point.

The specific value of the gas velocity below which the outlet orifice out of the gas feed is closed is the value at which the gas velocity is so low that the float is no longer supported. This value is dependent on the geometry of the gas feed nozzle and of the float and on the mass of the float and the properties of the flowing gas, for example density, viscosity or pressure.

The gas distributor nozzle according to the invention is used in particular in installations with a solid bed, for example a fluidized bed, a fluid bed or a moving bed. The construction of the gas distributor nozzle closes the orifice on complete or partial failure of the gas flow or on pressure reversal at the bottom, such that no particles from the solid bed can flow back through the nozzle. The associated disadvantages such as erosion, corrosion and reaction in the wind box can be prevented in this way. In addition, the process performed in the installation has to be interrupted less often to clean the wind box. This reduces downtime and thus decreases loss of production.

In one embodiment of the invention, the float has a constantly narrowing diameter on the side facing towards the gas feed. Said narrowing diameter enables the float to act at the same time as a closing element and to close the gas distributor nozzle if gas flow is too low. To this end, when the gas flow velocity is low, the float rests on a seat and in this way closes the gas distributor nozzle. Thus, gas cannot be blown into the solid bed, nor is backflow of particles from the solid bed possible. The seat in this case preferably takes the form of an annular limit stop, on which the float can be seated.

To ensure that the center of gravity of the float is below the point of force application of the resistance of the gas flow, it is particularly advantageous for the float to comprise a cavity on its side remote from the gas feed. The cavity leads to a marked reduction in mass, so meaning that the center of gravity is displaced to a lower position towards the limit stop. It is additionally possible to provide a solid tip, on the side of the float facing towards the gas feed, of a material with a higher density than the density of the material of the float in order in this way too to displace the center of gravity further towards the gas feed.

If the cavity is open on one side, i.e. on the side remote from the gas feed, material of the solid bed may pass into the cavity. This increases the mass of the float. Depending on the bulk density and quantity of the particles, it is possible on the one hand for the mass of the float to increase to such an extent that it can no longer be lifted by the gas flow. In this case, the gas distributor nozzle remains closed for further operation and in particular prevents the penetration of particles into the wind box. On the other hand, the increase in mass of the float due to the particles may remain below a critical value, so meaning that the function of the float is not impaired but rather the float continues to be supported by the incoming gas stream. The function of the float to prevent return flow in this case remains unimpaired. Accumulation of the particles in the cavity has the further advantage that these particles cannot flow past the float and in this way impair the function of the gas distributor nozzle as clack valve. Such impairment arises, for example, if particles become wedged between the surface of the float and the nozzle internal wall. This may result in a gap between float and nozzle internal wall and the float can no longer close the orifice in order to prevent backflow of particles in the event of low gas flow.

On the other hand, if it is necessary to prevent particles from accumulating in the cavity, the latter may alternatively also be closed. To this end it is possible, for example, to place a cover on the cavity. The cover may be connected to the float in an interlocking or non-interlocking manner, for example by welding, soldering, adhesive bonding, riveting, screwing or clamping. The most suitable type of connection depends, for example, on the size and material of the float.

In a preferred embodiment, the float is point symmetrical, particularly axially symmetrical, in regard to the central axis of the float. Particularly preferably, the float takes the form of a hollow cone, the tip of the cone being solid. The solid tip may in this case be made either from the same material as the hollow cone or from a material with a higher density than that of the material of the hollow cone. In operation, the float points with the tip towards the gas feed, such that in the event of an interruption to the gas flow, too low a flow velocity or a pressure reversal over the nozzle bottoms, the float drops with its tip into the gas feed and thereby closes the latter. To prevent the float from dropping completely into the gas feed, the diameter of the upwardly facing base of the cone is selected to be greater than the diameter of the gas feed or of the limit stop in the gas feed on which the cone lies in the closed state.

In one embodiment, the float additionally comprises a guide rod. Guidance with the guide rod likewise prevents the float from tilting or moving radially in the gas distributor nozzle, whereby function may be restricted. In the case in particular of a tilting float, the risk arises of said float getting stuck and thereby jamming in the gas distributor nozzle, so restricting function, in particular function as a non-return valve for closing the gas distributor nozzle on interruption of the gas flow or a pressure reversal so as to prevent particles from passing into the wind box.

It is particularly preferable for the guide rod to be formed at the cone tip in the case of a conical float. Due to the guide rod at the cone tip, the center of gravity of the float is displaced still further downwards and thus the distance to the point of force application of the resistance of the gas flow is increased.

To enable axial guidance of the float, the guide rod is preferably guided in a guide ring. The guide ring is here fastened to the gas feed using at least one web. The guide ring is preferably fastened with more than one web, for example with three or four webs, so increasing the stability of the guide ring. By using at least three webs, in particular, the stability of the guide ring against warping is increased, wherein the thickness of the webs is preferably selected in such a way that the free cross-sectional area of the gas feed is reduced by less than 25%. The guide ring thus remains in position even on loading.

In one particularly preferred embodiment, a guide stop is provided on the guide rod, which guide stop comes to a stop against the guide ring in the open state. The guide stop limits the orifice movement of the float. This prevents the float from oscillating up and down. The up and down oscillation is brought about by periodic shedding of vortices in float overtravel with a constant gas stream. The oscillation frequency with which the float oscillates up and down is dependent here on the properties of the float and of the gas flowing around it. In particular when used as a gas distributor nozzle in a large-scale fluidized bed installation, in which several hundred gas distributor nozzles may be installed, oscillation of the float cannot be tolerated, since oscillation of all the nozzles may lead to pulsating of the fluidized bed, whereby the fluidized bed installation may be damaged. Due to the guide stop, which is configured in such a way that the maximum orifice height of the float is not reached, at a constant gas velocity the float is held in its upper orifice position, namely the position defined by the guide stop.

The combined function of the gas distributor nozzle as a component for introducing the gas stream in the event of a constant pressure drop irrespective of the quantity of gas in the gas stream and at the same as a non-return valve for closing the gas feed on interruption of the gas stream or a pressure reversal may be achieved, for example, in that the gas feed takes the form of a sleeve and the float is guided in the sleeve. The sleeve preferably comprises a limit stop, on which the float lies in the closed state. In this case, the limit stop is constructed in an encircling manner in the sleeve, such that the limit stop acts as a valve seat. The limit stop may be obtained, for example, in that the sleeve has a smaller internal diameter below the limit stop and a larger internal diameter above it, the limit stop being formed in this case for example by a stepped widened portion in the sleeve. Above the limit stop the internal diameter of the sleeve is greater than the maximum diameter of the float, to permit gas flow around the float in the sleeve. In operation, the gas flows around the float through the gas distributor nozzle.

To establish a constant pressure drop, it is preferable for the sleeve to have a lower portion with a smaller internal diameter and an upper portion with a larger internal diameter, the upper portion having an internal diameter decreasing towards the gas feed. By way of the internal diameter decreasing towards the gas feed, the constant pressure drop may established, providing that the float is not yet located in its structurally defined end position. The lower portion may be differentiated from the upper portion for example by the limit stop, if the latter takes the form of a stepped widened portion in the sleeve.

Additional protection from penetration of particles into the gas feed and into the wind box can be achieved if the gas distributor nozzle additionally comprises a cap enclosing the gas feed, the float and the sleeve, said cap having orifices distributed over its circumference and being closed at the top. In this case, the gas flows upwards through the gas feed and around the float, is diverted at the lid of the cap and flows through the orifices into the solid bed. The orifices may here be distributed over the circumference of the cap at any desired height. The orifices may here be formed in one radial row or indeed in a plurality of rows. Any desired distribution is also possible. It is particularly preferable to provide one or more radially peripheral rows of orifices in the lower region of the cap, i.e. just above the bottom, in which the gas distributor nozzle is mounted.

The gas distributor nozzle configured according to the invention is suitable in particular for use in fluidized bed apparatus, fluid bed apparatus or moving bed apparatus. Use in fluidized bed apparatus, in particular fluidized bed reactors, is very particularly preferred. Such fluidized bed reactors are used for example in aniline production, melamine production, the production of acrylonitrile or the production of chlorine from hydrogen chloride using the Deacon process.

An example of a gas distributor nozzle configured according to the invention is explained in greater detail in the following description and is shown in the figures, in which.

Figure 1:
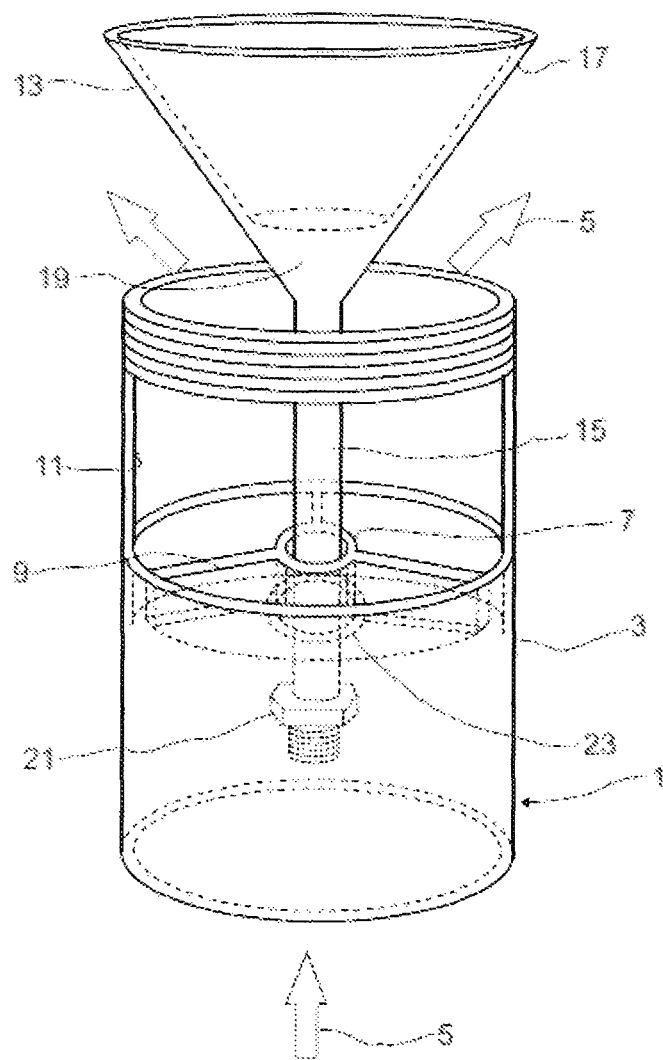
FIG. 1 is a three-dimensional representation of a gas feed with float.

A gas feed 1 takes the form of a sleeve 3, for example. The gas flows, as shown by arrows 5, from below into the sleeve 3, wherein to this end the sleeve 3 is connected for example to a gas-conveying pipe or is the end of a gas-conveying pipe. The sleeve 3 is preferably vertically oriented, wherein the gas flows into the sleeve 3 from below and flows out of the sleeve 3 at the top.

A guide ring 7 is accommodated in the sleeve 3, wherein the guide ring 7 is fastened by webs 9 to the internal wall 11 of the sleeve 3. To this end it is possible, for example, to weld the webs 9 to the internal wall 11 of the sleeve or indeed to connect them to a ring, the diameter of which corresponds to the internal diameter of the sleeve, and wedge them with the ring in the sleeve. Any other possible type of fastening with which the guide ring 7 can be fastened in the sleeve 3 is also conceivable.

If the guide ring 7 is fastened by webs 9 to the internal wall 11 of the sleeve 3, preferably at least three webs 9 are provided to stabilize the guide ring 7 against displacement and bending.

A float 13 is guided with a guide rod 15 in the guide ring 7. In the embodiment illustrated here, the float 13 takes the form of a hollow cone 17 with a solid tip 19. As a result of the solid tip 19, the center of gravity of the hollow cone 17 is displaced towards the tip 19. Further displacement of the center of gravity is brought about by the guide rod 15. This ensures that the center of gravity of the float 13 is lower than the point of force application of the resistance of the gas flow. As a result of the low position of the center of gravity, the position of the float 13 stabilizes if it starts to tilt. This makes it possible to prevent the float 13 from getting jammed.

To prevent jamming, it is also possible, as is shown by broken lines, to provide a second guide ring 23 below the guide ring 7.

A guide stop 21 is provided on the guide rod 15, for example in the form of a ring provided on the guide rod 15. This may, for example, be screwed onto the guide rod 15. The guide stop 21 limits upward movement of the float 13 when gas is flowing. In this way, up and down oscillation of the float can be prevented, as already described above.

When in operation, the float 13 is lifted by the gas flow 5 and thus opens up the upper end of the sleeve 3. The gas can flow freely out of the sleeve. As soon as the gas velocity falls below a given value or fails completely or a pressure reversal arises, the float drops downwards and comes to a stop against the upper end of the sleeve 3. In this way, the sleeve 3 is closed, meaning that, when used for supplying gas to a fluidized bed or a moving bed, particles are prevented from passing into the sleeve 3.

Figure 2:
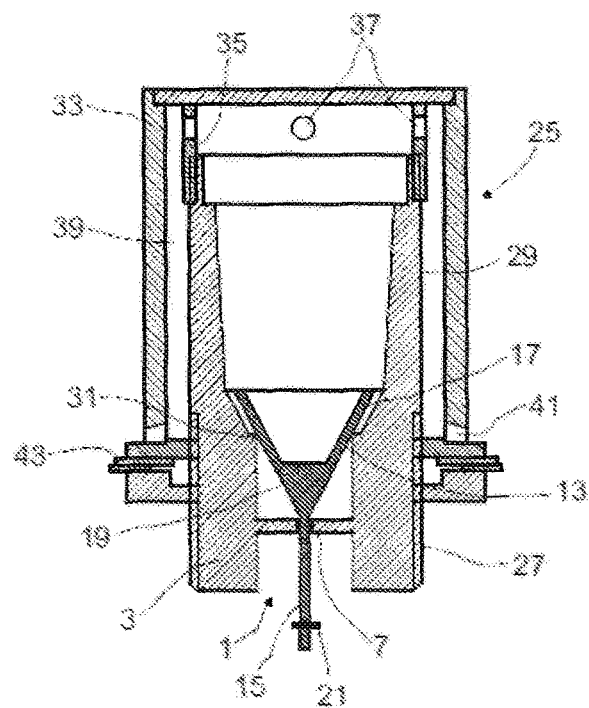
FIG. 2 is a sectional representation of a gas distributor nozzle with float in the closed position
Figure 3:
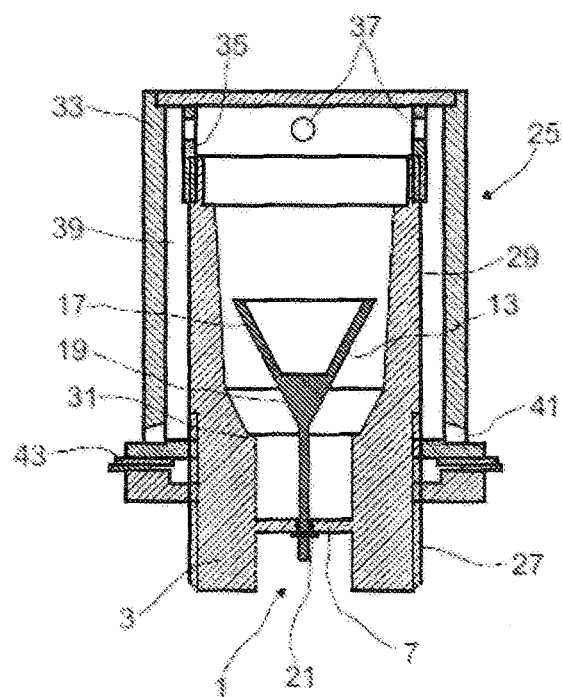
FIG. 3 shows the gas distributor nozzle illustrated in FIG. 2, with the float in the open position.

FIG. 2 shows a sectional representation of a gas distributor nozzle with float in the closed position, while FIG. 3 shows it the in open position.

The gas distributor nozzle 25 comprises a sleeve 3, wherein in the embodiment shown here the sleeve 3 has a lower portion 27 with a smaller internal diameter and an upper portion 29 with a larger internal diameter. At the point of transition from the lower portion 27 to the upper portion 29, a limit stop 31 is provided, on which the float 13 rests when the gas distributor nozzle 25 is closed, as illustrated here. In the lower portion 27, the guide ring 7 is formed, in which the guide rod 15 of the float 13 is guided.

To allow gas flow, the internal diameter of the upper portion 29 is greater than the maximum diameter of the float 13.

In the embodiment shown here, a cap 33 with an internal ring 35 is screwed onto the sleeve 3. Formed in the internal ring are orifices 37 through which the gas may flow into a gap 39 between the cap 33 and sleeve 3. The gas flows out of the gap 39 through orifices 41. It is also possible here to configure the cap 33 in such a way that a gap through which the gas may flow is formed between the cap 33 and a bottom 43, in which the gas distributor nozzle 25 is mounted.

In the position shown in FIG. 2, the float 13 lies on the limit stop 31 and thereby closes the gas feed 1. This prevents backflow, which entrains particles from a solid bed, from taking place through the gas distributor nozzle 25. Closure of the gas distributor nozzle 25 proceeds automatically, as soon as the gas velocity is no longer sufficient to lift the float 13.

FIG. 3 shows the position of the float 13 when gas is flowing through the gas distributor nozzle 25. The flowing gas lifts the float 13 until the guide stop 21 on the guide rod 15 comes to a stop against the guide ring 7. This upper limit prevents oscillation of the float 13 and in this way pressure fluctuations in the gas feed 1 can be reduced, so meaning that the gas flow 5 remains uniform.

As soon as the gas velocity drops again, the float 13 drops back downwards onto the limit stop 31 and thereby closes the gas feed 1.

LIST OF REFERENCE SIGNS

1 Gas feed
3 Sleeve
5 Gas flow
7 Guide ring
9 Web
11 Internal wall of sleeve 3
13 Float
15 Guide rod
17 Hollow cone
19 Solid tip
21 Guide stop
23 Second guide ring
25 Gas distributor nozzle
27 Lower portion
29 Upper portion
31 Limit stop
33 Cap
35 Internal ring
37 Orifices in internal ring 35
39 Gap
41 Orifice
43 Bottom

The invention claimed is:

1. A gas distributor nozzle comprising a gas feed (1) directed vertically upwards and a float (13) with which an outlet orifice out of the gas feed (1) may be closed if the gas velocity falls below a given value, no gas is flowing or a pressure reversal occurs, wherein the float (13) comprises a cavity on its side remote from the gas feed and has a center of gravity which is below a point of force application of the gas flow.

2. The gas distributor nozzle according to claim 1, wherein the float (13) has a constantly narrowing diameter on the side facing towards the gas feed (1).

3. The gas distributor nozzle according to claim 1, wherein the float (13) takes the form of a hollow cone (17), the tip (19) of the cone (17) being solid.

4. The gas distributor nozzle according to claim 1, wherein the float (13) comprises a guide rod (15).

5. The gas distributor nozzle according to claim 4, wherein the guide rod (15) is formed at a tip (19) of a hollow cone (17).

6. The gas distributor nozzle according to claim 4, wherein the guide rod (15) is guided in a guide ring (7).

7. The gas distributor nozzle according to claim 6, wherein a guide stop (21) is provided on the guide rod (15) which comes to a stop against the guide ring (7) in the open state.

8. A reactor comprising a solid bed and at least one gas distributor nozzle (25) according to claim 1, wherein the reactor is designed such that gas is introduced into the solid bed from a wind box via at least one gas distributor nozzle (25).

9. The reactor according to claim 8, wherein the solid bed is a fluidized bed, a fluid bed or a moving bed.

10. A gas distributor nozzle comprising a gas feed (1) directed vertically upwards and a float (13) with which an outlet orifice out of the gas feed (1) may be closed if the gas velocity falls below a given value, no gas is flowing or a pressure reversal occurs, wherein the float (13) comprises a cavity on its side remote from the gas feed and has a center of gravity which is below a point of force application of the gas flow, the float (13) being guided in a sleeve (3), said sleeve (3) comprising a limit stop (31) on which the float (13) rests in the closed state and having a diameter above the limit stop (13) which is greater than the maximum diameter of the float (13).

11. The gas distributor nozzle according to claim 10, wherein a cap (33) enclosing the gas feed (1), the float (13) and the sleeve (3) is provided, said cap (33) having orifices (41) distributed over its circumference and being closed at the top.

12. The gas distributor nozzle according to claim 10, wherein the sleeve (3) has a lower portion (27) with a smaller internal diameter and an upper portion (29) with a larger internal diameter, the upper portion (29) having an internal diameter decreasing towards the gas feed (1).

\* \* \* \* \*